United States Patent [19]
Telford

[11] 4,327,821
[45] May 4, 1982

[54] AUTOMATIC LOCKING CLUTCH WITH SLIDING CLUTCH RING

[75] Inventor: Thomas M. Telford, Gladstone, Oreg.

[73] Assignee: Warn Industries, Inc., Kent, Wash.

[21] Appl. No.: 164,221

[22] Filed: Jun. 30, 1980

Related U.S. Application Data

[63] Continuation-in-part of Ser. No. 88,165, Oct. 25, 1979, abandoned.

[51] Int. Cl.³ .................. F16D 1/06; F16D 43/20; F16D 45/00
[52] U.S. Cl. ............................. 192/35; 192/49; 192/54; 192/67 R; 192/93 R; 403/1
[58] Field of Search .................. 192/31, 35, 36, 49, 192/54, 67 R, 93 A, 93 R; 403/1

[56] References Cited

U.S. PATENT DOCUMENTS

| | | | |
|---|---|---|---|
| 910,456 | 1/1909 | Brush | 192/50 |
| 3,217,847 | 11/1965 | Petrak | 192/31 |
| 3,472,349 | 10/1969 | Ainsworth | 192/35 |
| 3,656,598 | 4/1972 | Goble | 192/35 |
| 4,163,486 | 8/1979 | Kagata | 192/35 |
| 4,192,411 | 3/1980 | Fogelberg | 192/49 X |
| 4,238,014 | 12/1980 | Petrak | 192/54 |
| 4,281,749 | 8/1981 | Fogelberg | 192/36 |
| 4,287,972 | 9/1981 | Petrak | 192/54 |

FOREIGN PATENT DOCUMENTS

| | | | |
|---|---|---|---|
| 2012379 | 7/1979 | United Kingdom | 192/54 |

*Primary Examiner*—Rodney H. Bonck
*Attorney, Agent, or Firm*—Graybeal & Uhlir

[57] ABSTRACT

An improved clutch of the type having concentric and spaced apart driving and driven members with a clutch ring in engagement with one of the members and urgeable into a simultaneous engagement with the other member is provided. A fixed cam member is provided nonrotational with respect to the driving and driven members. A second cam member is slidably movable around the first cam member whenever the clutch ring is in simultaneous engagement with the driving and driven members. A cam follower is in a cammed engagement with the first cam member and is movable axially apart from the first cam member into cammed engagement with the second cam member. The cam follower further urges the clutch ring into a simultaneous engagement with the driving and driven member whenever the driving member rotates with respect to the driven member.

9 Claims, 9 Drawing Figures

AUTOMATIC LOCKING CLUTCH WITH SLIDING CLUTCH RING

CROSS REFERENCE TO RELATED APPLICATIONS

This is a continuation-in-part of application Ser. No. 88,165, filed Oct. 25, 1979, and now abandoned.

FIELD OF THE INVENTION

The present invention relates, in general, to locking clutches, and more particularly to a fully automatic locking clutch having a sliding clutch ring.

BACKGROUND ART

It has long been recognized that locking clutches employing sliding clutch rings ideally should provide quick and positive engagement between the vehicle's driving member and the vehicle's driven member. A clutch providing quick and positive engagement between these members minimizes the problems resulting from a "snap start" condition. This condition typically occurs when the vehicle makes a transition from the two wheel drive mode to a four wheel drive mode with the sliding clutch ring being partially engaged to both the driving and driven members. As this occurs, in certain instances the vehicle's power source attempts to transmit more torque to the clutch ring than the clutch ring can withstand when in the partially engaged condition. As a result, the clutch fails to lock up with the result being that the clutch ring becomes damaged and rendered inoperable.

Prior attempts to produce locking clutches with sliding clutch rings have utilized either a moving cam type arrangement or a fixed cam type arrangement to activate the sliding clutch ring and produce clutch lockup. In general, a moving cam type arrangement is inherently slow to lock the driving and driven members. The principal reason is that a moving cam cannot be resisted with sufficient torque to rapidly effect clutch lockup without generating excessive heat while running in the locked condition. The heat must be dissipated by the vehicle's axle, with the effect being that the heat can burn out the vehicle axle bearings. Consequently, a locking clutch with a sliding clutch ring activated simply by a moving cam type arrangement does not produce a quick and positive lockup and thus is susceptible to the "snap start" problem. Typical prior art moving cam type arrangements are shown by Kagata, U.S. Pat. No. 4,163,486, and Goble, U.S. Pat. No. 3,656,598.

Locking clutches employing solely a movable cam type arrangement are susceptible to yet another problem. In the two-wheel drive mode, especially in cold weather situations where lubricants between the driving and driven members are cold, the driving member tends to rotate with respect to the driven member. In some instances, the rotational movement of the driving member may be as much as one-half the rotational movement of the driven member. Locking clutches employing the moving cam type arrangement in such a situation tend to effect clutch lockup. This becomes a major problem especially when the vehicle is moving at significant speeds.

Fixed cam type arrangements overcome these problems by typically producing faster lockup than moving cam type arrangements while resisting the tendency to inadvertently lock up when the vehicle is operated in the two wheel drive mode. Once the driving and driven members are in the locked condition, one came surface moves with respect to the other resulting in a chatter or a "ticking" between the cam surfaces. This typically results in a very high wear with the driving and driven members jumping in and out of a locked condition. Locking clutches utilizing solely fixed cam type arrangements are shown by Petrak, U.S. Pat. No. 3,217,847.

The present invention solves these problems of the prior art by providing a locking clutch utilizing a sliding clutch ring activated by both a fixed and moving cam. The sliding clutch ring initially is urged into an engaged condition between a driving and driven member by a fixed cam. Subsequently, once the locking clutch has effected engagement, a moving cam increases the engagement and maintains the locked condition. In this manner, the present invention provides a locking clutch having the quick and positive locking characteristics provided by a fixed cam as well as the advantages provided by a moving cam in maintaining a locked condition.

SUMMARY OF THE INVENTION

According to one aspect of the present invention, in the clutch of the type having concentric and spaced apart driving and driven members with a clutch ring in engagement with one of the members and urgeable into a simultaneous engagement with the other member, the improvement comprises a fixed cam member nonrotational with respect to the driving and driven members. A second cam member is slidably movable around the first cam member whenever the clutch ring is in simultaneous engagement with the driving and driven members. A cam follower is in a cammed engagement with the first cam member and is movable axially apart from the first cam member into a cammed engagement with the second cam member. The cam follower further urges the clutch ring into a simultaneous engagement with the driving and driven member whenever the driving member rotates with respect to the driven member.

It is an object of the present invention to provide a locking clutch having a sliding clutch ring effecting hub lockup in a quick and positive manner.

It is a further object of the present invention to provide a locking clutch initially effecting clutch lockup with a fixed cam member.

A still further object of the present invention is to provide a locking clutch utilizing a moving cam member to maintain clutch lockup.

The foregoing, and other objects, features, and advantages of the present invention will become more apparent in light of the detailed description of the preferred embodiment thereof set forth hereafter, and illustrated in the accompanying drawings.

BEST MODE OF CARRYING OUT THE INVENTION

Figure 1:
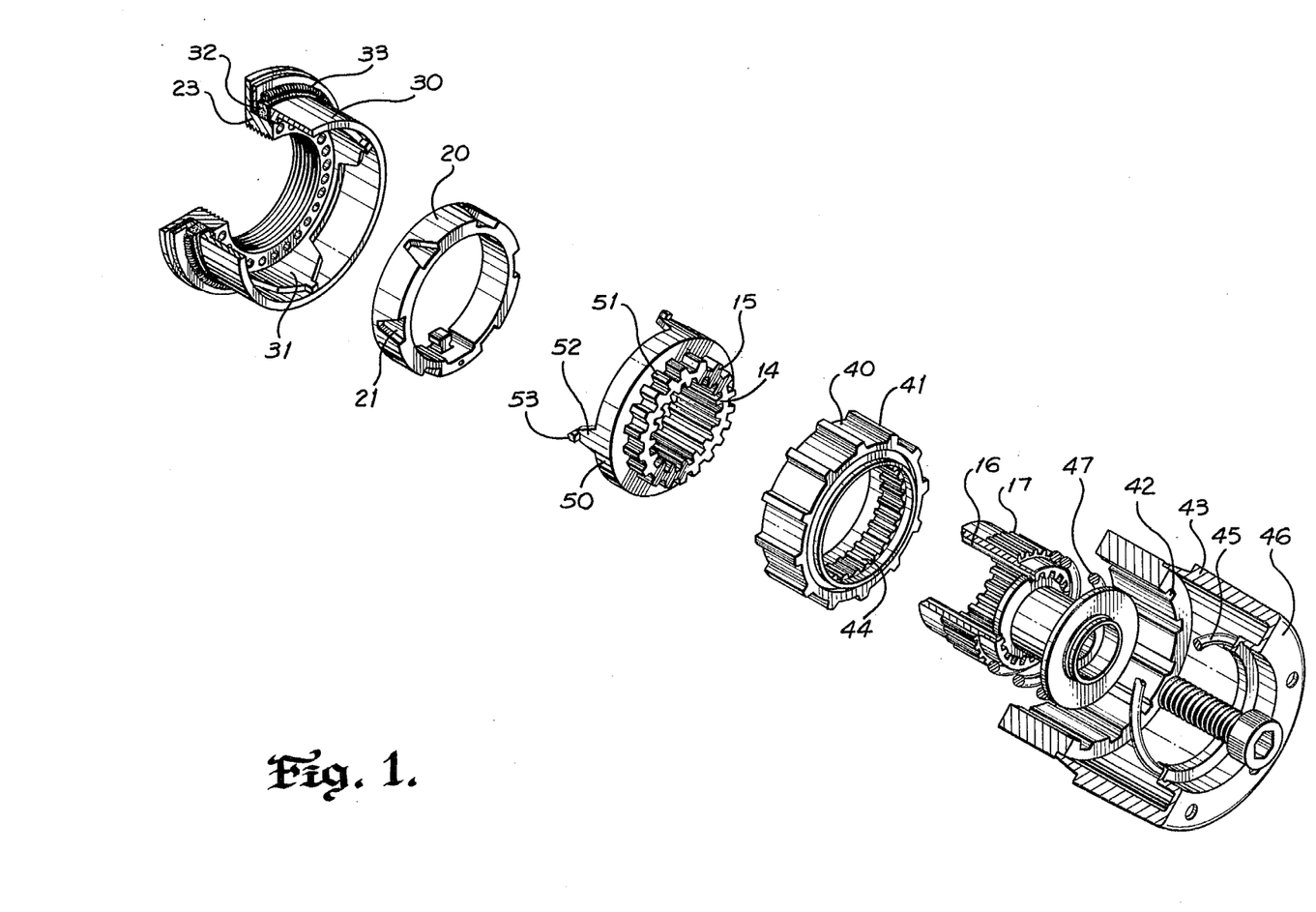
FIG. 1 is an exploded perspective view of a typical locking clutch according to the present invention with portions shown broken away for the sake of clarity.
Figure 6:
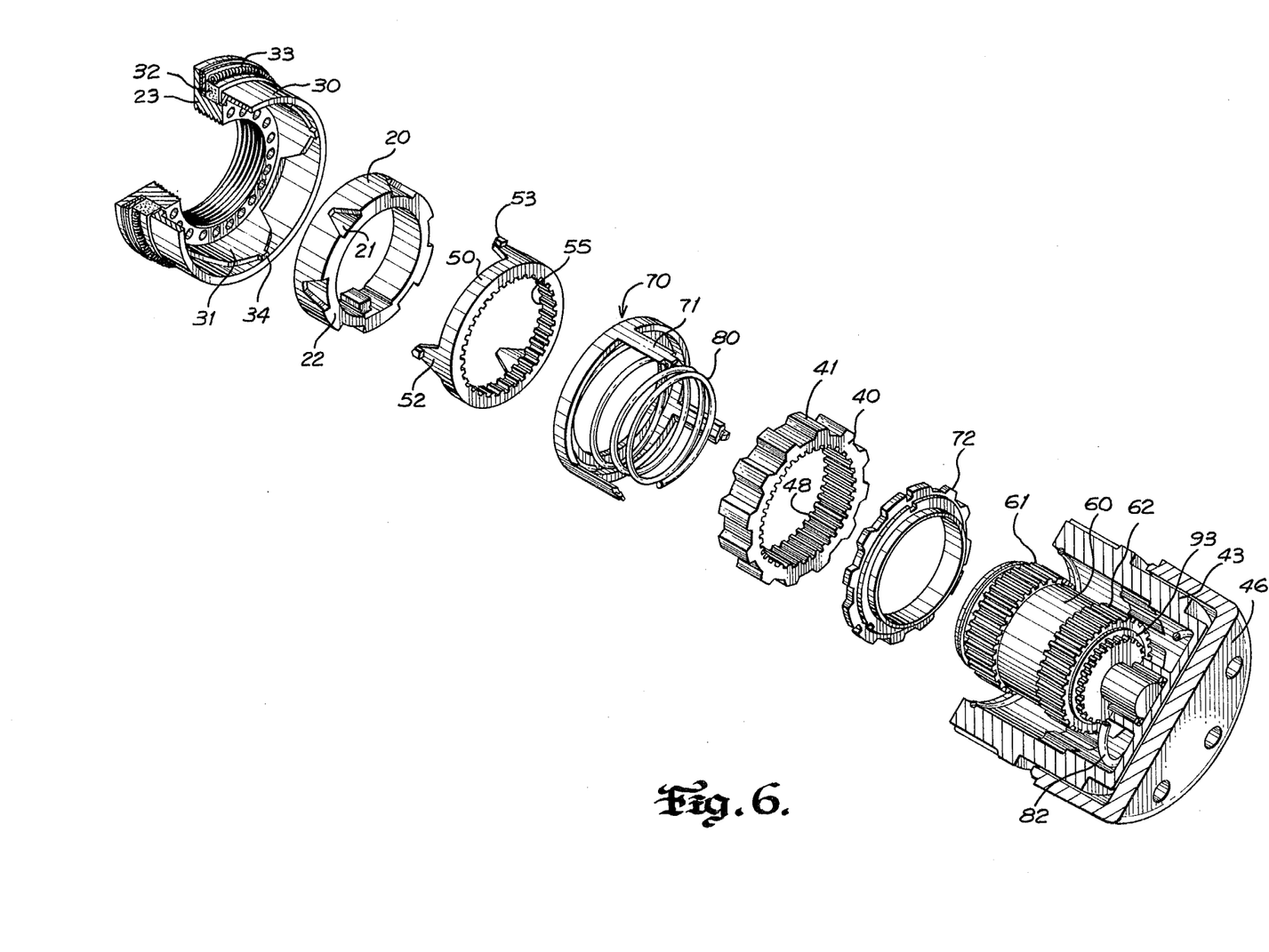
FIG. 6 is an exploded perspective view of another embodiment of the present invention with portions broken away for clarity.

The locking clutch of the present invention is of the type having concentric and spaced apart driving and driven members with a clutch ring being in engagement with one of the members and urgeable into a simultaneous engagement with the other member. With reference to FIGS. 1 and 6, the improvement in this type of clutch comprises a fixed or first cam member 20 nonrotatable with respect to both the vehicle's driving and driven members. A second or moving cam member 30 is movable around the first cam member whenever the clutch ring 40 is in simultaneous engagement with the driving and driven members. A cam follower 50 is in a cammed engagement with the first cam member and is movable axially apart from the first cam member and into a cammed engagement with the second cam member. The cam follower further urges the clutch ring to a simultaneous engagement with the driving and driven member whenever the driving member rotates with respect to a driven member. These and other members comprising the locking clutch of the present invention will next be described below in more detail.

Figure 2:
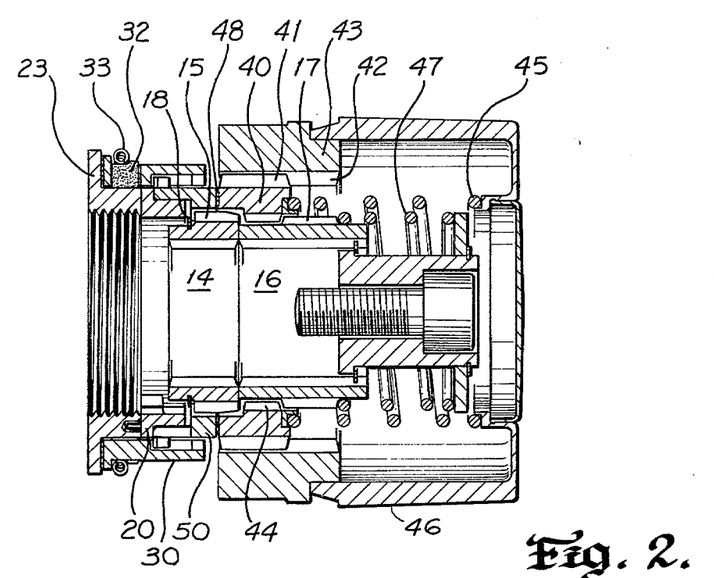
FIG. 2 is a sectioned side elevational view of a typical locking clutch showing the clutch in the unlocked mode.
Figure 3:
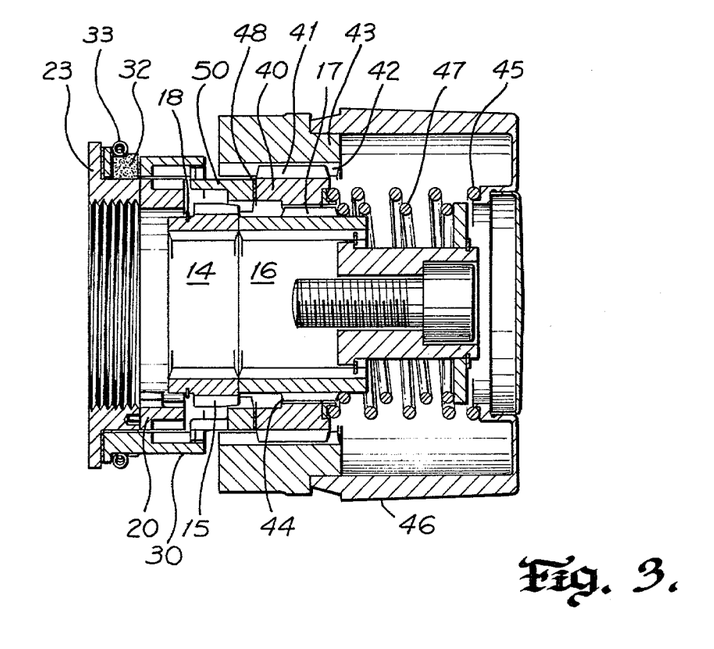
FIG. 3 is a sectioned side elevational view of a typical locking clutch showing the clutch in the locked mode.

With reference to FIGS. 2, 3, the clutch of the present invention is generally disposed between a vehicle's concentric and spaced apart driving and driven members. The vehicle driving member, typically a vehicle axle shaft, is in splined engagement with both a first hub axle shaft 14 and a second hub axle shaft 16. The first and second hub axle shafts axially abut each other along the length of the vehicle axle shaft with the second hub axle shaft adapted to be axially displaceable along the vehicle axle shaft as will be discussed more fully below. The first hub axle shaft carries a plurality of splines 15 disposed circumferentially around its outside surface extending axially along its length. The second hub axle shaft carries a plurality of splines 17 disposed circumferentially around its outside surface with the splines extending axially along a portion of its length. As shown in FIG. 1, splines 15, 17 are nonalignable with each other preventing the cam follower from being urged from the first hub axle shaft onto and into engagement with the second hub axle shaft. The first hub axle shaft further carries a retaining ring 18 (see FIGS. 2, 3) disposed circumferentially around one end securely engaging the first said axle shaft to the vehicle axle shaft.

Disposed between the driving and driven members is a slidable clutch ring 40 carried by one of the members. As shown in FIG. 1, the clutch ring has a plurality of splines 41 disposed circumferentially around its outside surface extending axially along the length of the clutch ring. These splines are in a splined engagement with a plurality of complementary splines 42 disposed along the inside surface of the hub body 43. Disposed circumferentially along the inside surface of the clutch ring are a plurality of splines 44 urgeable into a simultaneous splined engagement with the splines 17 carried on the second hub axle shaft. In this manner, when the clutch ring is axially displaced by movement of the cam follower as will be described, the clutch ring becomes simultaneously engaged to the vehicle's axle shaft and to the hub body, thereby effecting clutch lockup.

A cam follower 50 is disposed adjacent the clutch ring and abuts one end of the clutch ring. The cam follower has a plurality of splines 51 disposed circumferentially around its inside surface in splined engagement with the plurality of splines 15 carried on the first hub axle shaft. The cam follower has a plurality of cam surfaces 52 engageable with a corresponding plurality of cam surfaces carried by the fixed cam. Extending radially upwardly from each cam surface is a tooth 53 for engagement with the plurality of cammed surfaces carried on the moving cam as will be described in more detail below.

The fixed cam carrying a plurality of cam surfaces 21 circumferentially disposed around its outside surface, abuts and is nonrotatably secured to a portion of the vehicle, such as the vehicle's spindle lock nut 23 or the like. The spindle lock nut is spaced apart from both the hub body and the hub axle shaft. The fixed cam has a lock tab (not shown) extending axially outwardly from the face of the fixed cam abutting the spindle lock used to engage and secure the fixed cam to the spindle lock nut.

A moving cam 30 in slidable engagement with the spindle lock nut 23 carries a plurality of cam surfaces 31 circumferentially around its inside surface. The moving cam extends axially outwardly around the fixed cam as well as the cam follower. Disposed at one end of the moving cam and within a plurality of openings (not shown) are a plurality of drag shoes 32 in slidable engagement with the spindle lock nut. The drag shoes are maintained within the openings by a spring 33 circumferentially disposed around the outside surface of the moving cam.

Two wheel drive mode.

With reference to FIGS. 2-5, the operation of the present invention in the free run or two wheel drive mode will next be described. In the two wheel drive mode, the cam follower 50 abuts the fixed cam 20, with the plurality of cam surfaces 52 carried on the cam follower in engagement with the plurality of cam surfaces 21 carried by the fixed cam (see FIG. 4). In this configuration, the moving cam extends around and axially outwardly from both the fixed cam and the cam follower. In this mode, the vehicle's axle shaft, the first hub axle shaft 14, and second hub axle shaft 16 are nonrotational with respect to the vehicle's hub and vehicle hub body 43. The slidable clutch ring 40 is urged axially toward the cam follower by spring 45 and is prevented from effecting a simultaneous engagement with the second hub axle shaft by the spring. The clutch ring, being splined to the hub body, rotates at a rotational speed equivalent to that of the vehicle hub. Relative motion occurs between the cam follower and the clutch ring along bearing washer 48 (see FIGS. 1, 2). In the two wheel drive mode, relative motion between the cam follower and clutch ring produces torque, but in that the operation of the present invention in this mode is substantially a fixed cam type arrangement, the torque generated by this relative motion is insufficient to cause the cam surfaces 52 cammed by the cam follower to move relative to the cam surfaces 21 carried by the fixed cam. As such, the clutch ring is not axially displaced into a simultaneous splined engagement with the hub body and the axle shaft.

Lockup Mode.

Figure 4:
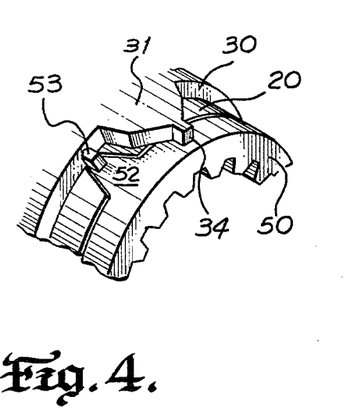
FIG. 4 is a perspective view showing the relationship between the fixed cam, moving cam, and cam follower when the locking clutch of the present invention is in the unlocked mode.
Figure 5:
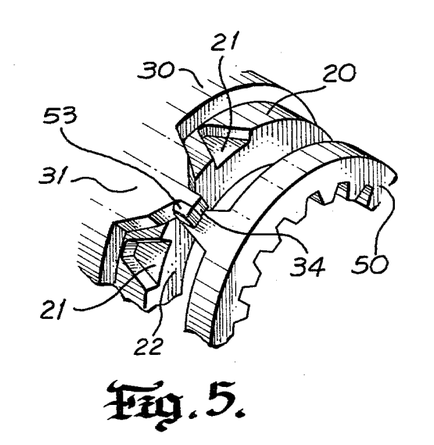
FIG. 5 is a perspective view showing the relationship between the fixed cam, moving cam and cam follower when the locking clutch of the present invention is in the locked mode.

With reference to FIGS. 3–5, the operation of the present invention in the lockup mode of four wheel drive mode will next be described. In this mode, both the vehicle's axle shaft and the vehicle hub body are rotational with respect to each other. As the vehicle's axle shaft begins to rotate, the first hub axle shaft 14 and the second hub axle shaft 16 both being splined to the vehicle's axle shaft begin to rotate. The cam follower 50 being splined to the first hub axle shaft also begins to rotate. Since the fixed cam is secured to the spindle lock nut, it is prevented from rotation, consequently the plurality of cam surfaces 52 carried on the cam follower begin to move along the plurality of cam surfaces 21 carried by the fixed cam. This movement axially displaces the cam follower along the splines 15 carried by the first hub axle shaft. The axial displacement urges the sliding clutch ring axially forwardly compressing the spring 45 permitting the clutch ring to become simultaneously splined to the vehicle's axle shaft (through the second hub axle shaft 14) and the hub body 43. As the cam surfaces 52 continue to move with respect to the cam surfaces 21, the surfaces axially separate from each other with the teeth 53 engaging and moving radially along the face 22 on the fixed cam. As the teeth 53 move along the face 22, the teeth engage a plurality of cam surfaces 31 carried by moving cam 30. When this occurs, the cam follower is further displaced away from the fixed cam urging the sliding clutch ring into further engagement between the vehicle's axle shaft and hub body. The axial movement of the cam follower away from the fixed cam continues until the teeth 53 on each cam surface 52 engage a cam stop 34 carried by the cam surfaces 31. When this occurs, axial movement of the cam follower ceases, and the torque generated by the axle shaft is sufficient to cause the moving cam 30 to begin to rotate with respect to the spindle lock nut.

In the event the sliding clutch ring is unable to become simultaneously engaged to the vehicle's axle shaft, as may occur when the splines 44 disposed along the inside surface of the clutch ring are misaligned with respect to the splines on the second hub axle shaft, the movement of the cam follower axially away from the fixed cam and into a cammed engagement with the moving cam urges the second hub axle shaft axially away from the first hub axle shaft thereby compressing spring 47. This misalignment does not prevent the cam follower from engaging the plurality of cam surfaces 31 carrying the moving cam. When the splines in the clutch ring and the second hub axle shaft become aligned with each other, the spring 47 urges the second hub axle shaft axially toward the first hub axle shaft so that the sliding clutch ring effects a simultaneous engagement between the second hub axle shaft and the hub body. At this point in time, the clutch is in a locked up condition with the moving cam slidably rotatable about the spindle lock nut.

An alternate embodiment of the present invention is shown in FIGS. 6–9. In this embodiment, a hub axle shaft 60 is splined to the vehicle's driving member and rotates with the driving member. A fixed or first cam member 20 is nonrotatable with respect to both the driving member and the vehicle's driven member. A second or moving cam member 30 is movable around the first cam member whenever the sliding clutch ring 40 is simultaneously engaged to the driving and driven members. The clutch ring is axially movable within a cage member 70 which is in a splined engagement with the clutch ring and rotates therewith. The cam follower 50 is in cam engagement with the first cam member, abuts the cage member, and is movable axially apart from the first cam member into a cam engagement with the second cam member. The cam follower in conjunction with the first and second cam members urges the cage member and clutch ring into simultaneous engagement with the vehicle's driving and driven members whenever the driving member rotates with respect to the driven member. These and other features comprising the alternate embodiment of the present invention will next be described in more detail. With reference to FIG. 6, a hub and shaft 60 is secured to the vehicle's driving member such as by splines or the like, and rotates with the driving member. In this embodiment, the hub axle shaft replaces the first and second hub axle shafts (see FIGS. 1–3) described in the previous embodiment of the present invention. The hub axle shaft has a plurality of splines 61, 62 disposed circumferentially around the outside surface of the axle shaft at opposite ends of the shaft. The plurality of splines extend axially along a length of the axle shaft and are spaced apart from each other. Splines 61 are complementary to and in splined engagement with a plurality of splines 55 disposed circumferentially around the inside surface of the cam follower 50. As will be described below, the cam follower is displaceable axially along these splines whenever the vehicle's driving member rotates with respect to the driven member. Splines 62 are complementary to a plurality of splines 48 disposed circumferentially around the inside surface of the sliding clutch ring 40, and urgeable into engagement with each other whenever the present invention is in the lockup mode. The hub axle shaft is prevented from axial movement along the driving member by the axle extender 90.

The sliding clutch ring 40 is axially movable within a cage member 70. The cage member has a plurality of guide arms 71 extending axially outwardly therefrom in splined engagement with the plurality of splines 41 disposed circumferentially around the outside surface of the clutch ring. In this manner, the clutch ring is axially movable along the guide arms to effect clutch lockup. A cage cap 72 is snap fitted to the plurality of guide arms, abuts the clutch ring and ensures the clutch ring is maintained within the cage as it axially moves therein. A spring 80 urges the clutch ring into simultaneous splined engagement between the driving and driven members whenever the plurality of splines 48, 62 on the clutch ring and hub axle shaft respectively are aligned with respect to each other as will be described below. The spring is preloaded to ensure the clutch ring is returned to its initial position within the cage when the clutch makes a transition from the lockup mode to the two wheel drive mode.

Figure 7:
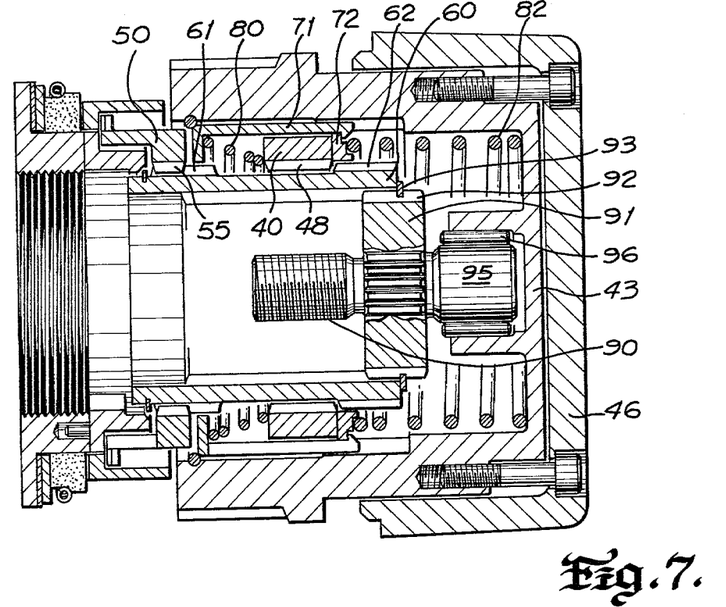
FIG. 7 is a sectioned side elevational view showing the clutch of FIG. 6 in the unlocked mode.
Figure 8:
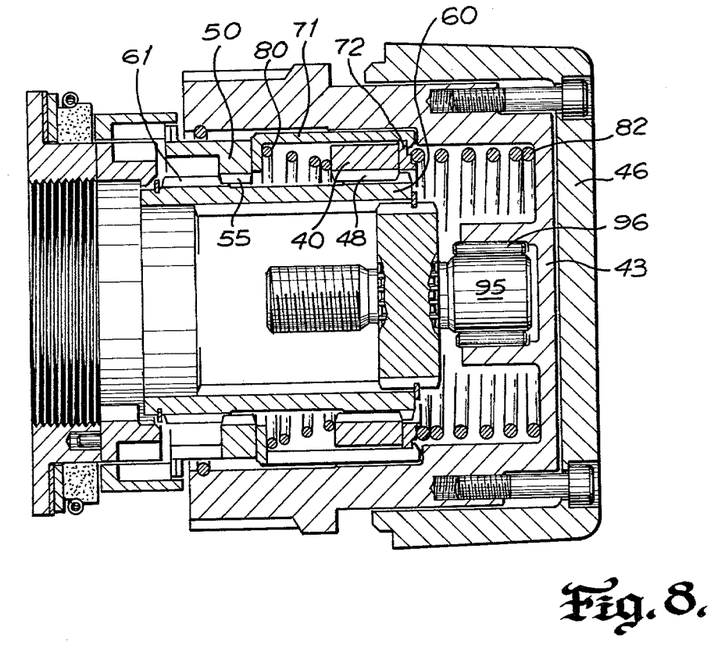
FIG. 8 is a sectional side elevational view showing the clutch of FIG. 6 in the locked mode.
Figure 9:
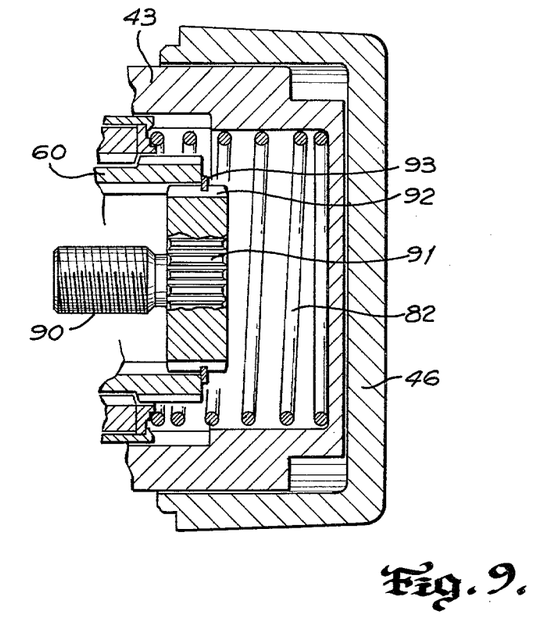
FIG. 9 is an enlarged sectional side elevational view of the clutch of FIG. 6 showing the axle extender.

The wheel hub axle shaft is in splined engagement with the driving member and is secured thereto by an axle extender 90. The axle extender is screwably secured to one end of the driving member. The axle extender has a head 91 having a diameter substantially the same as the outside diameter of the driving member. The head has a plurality of splines 92 circumferentially disposed therearound which are complementary to the splines disposed within the inside surface of the hub axle shaft. In this manner, when the axle extender is screwably secured into one end of the driving member with the splines on the axle extender and driving member aligned with respect to each other, the hub axle shaft is slidably urged into engagement with the driving member and a portion of the axle extender (see FIGS. 7, 8). A retaining ring 93 is disposed circumferentially around the head of the axle extender, abuts one end of the hub axle shaft and further secures the axle shaft from axial movement along the driving member. With reference to FIGS. 7–8, a hub extender 95 having a needle bearing 96 therearound is secured to the axle extender and provides a means with which to attach the clutch cap 46. The fixed or first cam member 20, the second or moving cam member 30, and the cam follower 50 have been described with respect to the previous embodiment of the present invention. The operational details of these members, together with the other members comprising the alternate embodiment of the present invention, can best be understood with reference to a description of the operation of the alternate embodiment which next follows.

Two Wheel Drive Mode.

With reference to FIGS. 6–7, in the two wheel drive mode, the vehicle's driving member is nonrotatable with respect to the vehicle's driven member. In this mode, the clutch ring being splined to the inside surface of the driven member rotates with respect to the driving member. The cage member 70, and the cage cap 72 being splined to the clutch ring similarly rotate with respect to the driving member. The cage member abuts the cam follower, and rotates with respect to the cam follower. The rotational movement of the cage member along the cam follower creates a torque which is not sufficient to cause the cam surfaces 52 on the cam follower to move with respect to the cam surfaces 21 on the fixed cam 20. As a result, the cam follower is not axially displaced along the hub axle shaft and the switch ring is not axially displaced into simultaneous engagement with the driving member.

Lockup Mode.

With reference to FIGS. 6 and 8, in the four wheel drive mode, the vehicle's driving member is rotatable with respect to the driven member. When this occurs, the relative rotational movement causes the cam follower to become axially displaced with respect to the cam member 20 as has been described. This axial movement axially displaces the cage member, and the sliding clutch ring causing splines 48 within the inside surface of the clutch ring to engage the splines 62 on the outside surface of the hub axle shaft. If the splines are aligned with respect to each other, further movement of the cam follower urges the clutch ring into simultaneous engagement between the vehicle's driving and driven members. In the event the splines on the clutch ring and the hub axle shaft are not aligned with respect to each other, further movement of the cam follower urges the cage member axially toward the clutch ring compressing springs 80 and 82. At such time the splines on the clutch ring and the hub axle shaft become aligned, the spring urges the clutch ring into simultaneous engagement between the driving and driven members thus effecting clutch lockup.

I claim:

1. In a vehicle clutch of the type having concentric and spaced apart driving and driven members, including a clutch ring in engagement with one of the members and urgeable into simultaneous engagement with the other member, the improvement comprising:
    (a) a first cam member rigidly fixed to the vehicle and nonrotatable with respect to the driving and driven members for all rotational speeds therebetween;
    (b) a second cam member slidably movable around said first cam member whenever the clutch ring is simultaneously engaged to the driving and driven members; and
    (c) a cam follower abutting the clutch ring and in cam engagement with said first cam member and movable axially apart from said first cam member into a cammed engagement with said second cam member thereby urging the clutch ring into simultaneous engagement with the driving and driven member whenever the driving member rotates with respect to the driven member.

2. The clutch of claim 1 further including means urging said cam follower out of a cammed engagement with said second cam member and into a cammed engagement with said first cammed member whenever the driving member is nonrotational with respect to the driven member.

3. The clutch of claim 1 further including means enabling said cam follower to become in cammed engagement with said second cam member whenever the driving member is rotational with respect to the driven member and the clutch ring is unable to be urged into simultaneous engagement therebetween.

4. The clutch of claim 3 wherein said means comprises an axially movable cage disposed between said cam follower and said clutch ring, said clutch ring being axially movable therein, said cage being splined to said clutch ring urging said clutch ring into simultaneous engagement with said driving and driven members whenever said cage is moved axially by said cam follower.

5. The clutch of claim 1 wherein said cam follower abuts the clutch ring and is in engagement with the driving member.

6. A vehicle clutch locking concentric and spaced apart driving and driven members comprising:
    (a) a fixed cam secured to the vehicle and nonrotatable with respect to the driving and driven members for all rotational speeds therebetween;
    (b) a movable cam slidably rotatable around said fixed cam whenever the driving and driven members are locked with respect to each other;
    (c) a clutch ring in engagement with one concentric member and urgeable into simultaneous engagement with the other concentric member thereby locking the concentric members together; and,
    (d) a cam follower abutting said clutch ring in cam engagement with said fixed cam and axially movable apart therefrom into a cammed engagement with said movable cam thereby urging said clutch ring into simultaneous engagement with the other concentric member.

7. The clutch of claim 6, further including means urging said cam follower out of cammed engagement with said movable cam and into cammed engagement with said fixed cam whenever the driving member is nonrotational with respect to the driven member.

8. The clutch of claim 6, further including means enabling said cam follower to become in cammed engagement with said movable cam whenever the driving member is rotational with respect to the driven member and said clutch ring is unable to be urged into simultaneous engagement therebetween.

9. The clutch of claim 6 wherein said means comprises an axially movable cage disposed between said cam follower and said clutch ring, said clutch ring being axially movable therein, said cage being splined to said clutch ring urging said clutch ring into simultaneous engagement with said driving and driven members whenever said cage is moved axially by said cam follower.

* * * * *